Dec. 4, 1928.
W. H. NOELTING
1,693,658
COMBINATION PLATE CASTER SOCKET AND SLIDE
Filed March 14, 1927  2 Sheets-Sheet 1
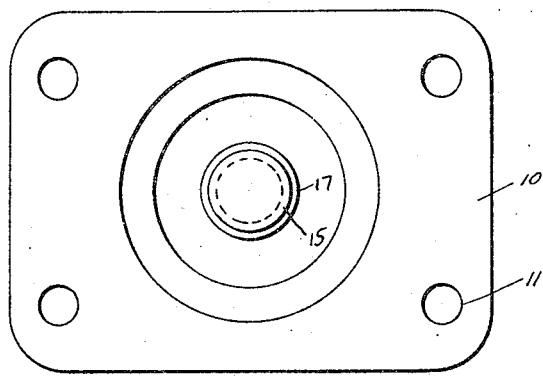
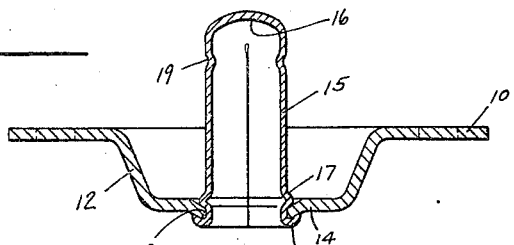
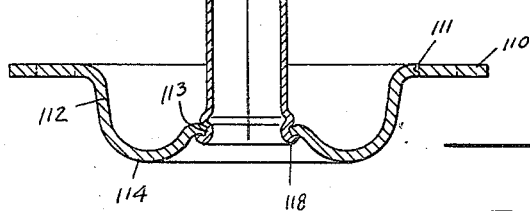
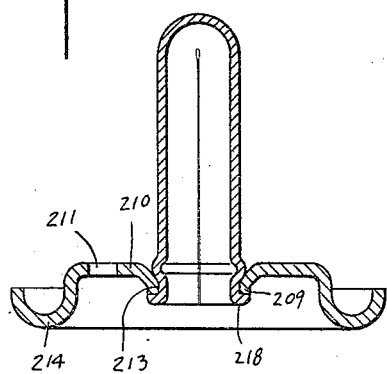
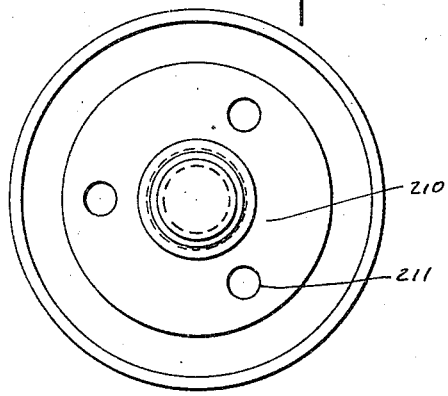
INVENTOR.
WILLIAM H. NOELTING.
BY *Lockwood, Lockwood, Goldsmith & Gall*
ATTORNEYS.

Dec. 4, 1928.  W. H. NOELTING  1,693,658
COMBINATION PLATE CASTER SOCKET AND SLIDE
Filed March 14, 1927    2 Sheets-Sheet 2
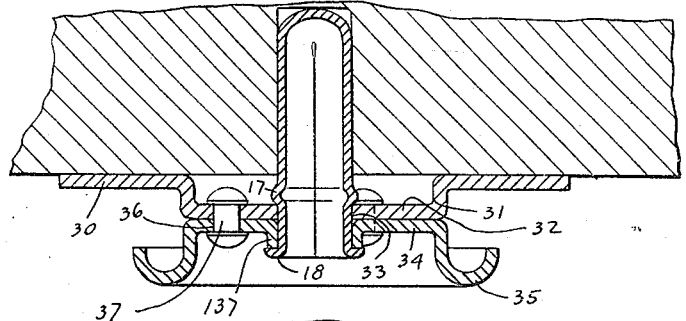
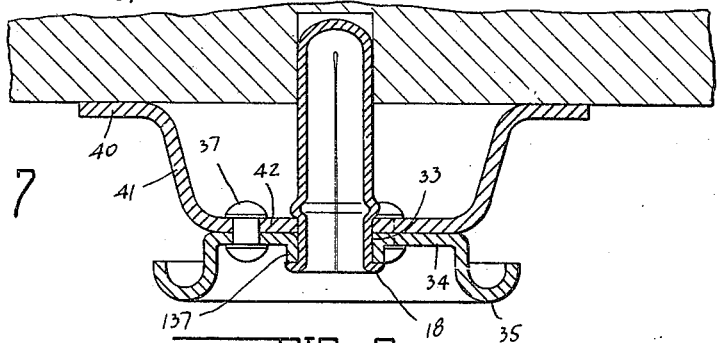
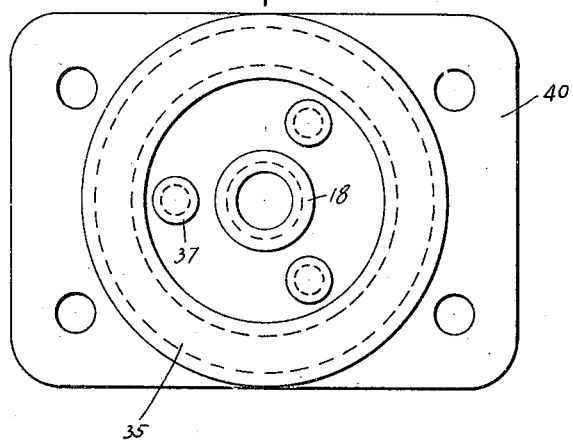
INVENTOR.
WILLIAM H. NOELTING.
BY Lockwood, Lockwood, Goldsmith & Galt
ATTORNEYS.

Patented Dec. 4, 1928.

1,693,658

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

COMBINATION PLATE-CASTER SOCKET AND SLIDE.

Application filed March 14, 1927. Serial No. 175,206.

This invention relates to a caster socket and slide.

The chief object of this invention is to provide a rigid and rugged caster socket of the plate type for supporting relatively heavy loads and have the same so fashioned, or provided with, means whereby the caster may be removed and the socket or means so provided detachably receive a slide or itself constitute a slide support for the heavy load.

The chief feature of the invention consists in the formation of the portion of a plate between the tube supported portion and the load supported portion in the form of a slide or constituting a slide support.

Inasmuch as one of these heavy loads is that of a mechanical refrigerator of the household type and since in some localities vermin are extremely prevalent, the slide forming portion is fashioned so that it constitutes a vermin proof socket and thus prevents passage of the vermin into the refrigerator.

The full nature of the invention will be understood from the accompanying drawings and the following description and claims:

In the drawing Fig. 1 is the top plan view of one form of combination plate caster socket and slide. Fig. 2 is a central sectional view thereof. Fig. 3 is a view similar to Fig. 2 and a very slightly modified form of the invention. Fig. 4 is a central sectional view of still a further form of the invention. Fig. 5 is a top plan view of the form shown in Fig. 4. Fig. 6 is a vertical sectional view through combination slide and socket and showing the same associated with the lobe. Fig. 7 is a similar view of still a further form of the invention. Fig. 8 is a top plan view of the invention shown in Fig. 7.

In the drawings there is illustrated several types of combination caster sockets and slides; each of which has certain advantages over the other and the preferred forms of the invention upon which to the extent an election is made to draw the detail claims are those forms shown in Figs. 6 and 7. In addition to serving as a support for a detachable slide when the casters are removed from the socket or itself constituting a slide so as to support stationarily a heavy load such as household refrigerators or the like, certain forms of the socket are also adapted to serve as vermin stops since there is provided a completely enclosing channel that may receive oil or water over which most of the vermin will not cross.

One of the simplest forms of the invention is shown in Figs. 1 and 2 and 10 indicates the plate portion adapted to be secured to the under face of the load, see Figs. 6 and 7. The plate is provided with a suitable number of anchorage receiving apertures 11 whereby the plate may be secured to the under face of the load. The intermediate portion of the plate is depressed or formed in the shape of a cup, bowl or saucer, preferably annular in outline and indicated by the numeral 12. The central portion of the cup or plate is apertured as at 13 and in Figs. 1 and 2 the cup is shown provided with a substantially flat bottom 14. The stem receiving socket tube is shown formed from a single sheet of metal rolled into semi-tubular formation and turned back upon itself to provide a tubular socket having the cylindrical bore 15 and curved head 16. An anchoring peripheral flange 17 adjacent the mouth of the tooth and a clamp co-operating flange 18 at the end of the tube mount the tube.

In Fig. 2 near the head of the tube there is provided indentations 19 for cooperation with the stem of a caster to be received by the socket and to be detachably retained therein. When the plate 10 is secured to the load or support and a caster is inserted in the tube 15 the support or load can be moved into the desired position, after elevating the load from the supporting surface until the caster stem can be removed from the tube, the support is lowered until the caster socket engages the supporting surface (floor) and thereafter continues to support the load in its relatively permanent location. The load may be slid from its lowered position into its final position since it bears on a portion of the socket and projects beyond the plane of anchorage of the socket.

In Fig. 3 a slightly modified form of the invention is illustrated and this form differs from the formation shown in Figs. 1 and 2 by the apertured portion receiving the tube being positioned in a plane intermediate of the plate anchorage support and the slide contact. 110 indicates the plate having the anchorage receiving apertures 111. The plate is drawn downwardly at 112 and terminates in an annular arcuately sectioned slide forming portion 114 which terminates in an upwardly extending portion having the central aperture 113. The anchorage of the stem instead of being positioned in the same plane of the slide portion or projecting beyond the same as heretofore shown is positioned intermediate the plane of the slide support and the plane of the plate anchorage. The tube is substantially the same as that shown in Fig. 2.

Figs. 4 and 5 illustrate a modified form of the invention. In this form of the invention the slide portion 214 is annular and is exteriorly positioned with respect to the plate portion 210 and the anchorage apertures 211 are provided in said plate portion 210. Said portion is provided with a central aperture 213 and herein as shown in Figs. 2 and 3, the wall of the same is directed downwardly but in this form of the invention an appreciable annular flange 209 is provided which being substantially cylindrical in shape serves as a stiffening portion. The tube is substantially the same as that hereinbefore indicated except that the indentations 19 shown in Figs. 2 and 3 are omitted. When the combination socket and slide shown in Figs. 4 and 5 is secured to the load the annular channel formed by the slide portion 214 may be filled with vermin repellent liquid such as water or oil and thus prevent vermin gaining access to the load.

Figs. 6 to 8 inclusive are directed to a form of the invention which is a combination of those shown in Figs. 1 to 5 inclusive. In Fig. 6 the plate 30 is substantially the same in outline as that shown in Figs. 1 and 8 and it has a cup or saucer portion 31 having the bottom 32 and the central aperture 33. Another and slide forming plate 34 has an annular and arcuately sectioned slide forming portion 35 positioned immediately thereabeneath (and herein in abuttable relation) and includes registering aperture 36 whereby through rivets 37 the plate and slide are secured together. Other equivalent anchorage means may be provided or even an interlocking connection may be substituted for these rivets. Slide 34 includes a downwardly extending portion 137 concentric with the central aperture 33 and said central portion 137 and aperture 33 may receive the socket formed substantially as shown in Figs. 2 to 4 inclusive, the upper flange 17 bearing on the plate and the lower flange 18 bearing on the slide and exerting a clamping action thereon whereby the tube is rigidly secured to the combination plate and slide.

Fig. 7 is similar to Fig. 6 but herein plate 40 is shown provided with a deeper drawn saucer portion 41. Terminating in the slide anchorage portion 42 other than the aforesaid changes, it is identical to that shown in Fig. 6. Fig. 8 is a plan view of either form of the invention shown in Figs. 6 and 7.

The invention claimed is:

1. In a caster socket, the combination of a load sustaining plate portion, a slide portion rigidly connected thereto and supported by the plate portion for supporting a load, and a socket tube for detachably receiving a caster stem and having a pair of spaced flanges adjacent its lower end, said slide portion being apertured for tube reception and clampingly mounted thereon between said flanges for tube support.

2. A device as defined by claim 1, characterized by the plate and slide portions being so formed as to position the slide portion in spaced relation to the plane of anchorage of the plate portion.

3. A device as defined by claim 1, characterized by the plate and slide portions being so formed as to position the slide portion in spaced relation to the plane of anchorage of the plate portion, and being further characterized by the mounting of the tube thereon in a plane intermediate the slide contact plane and the plate anchorage plane.

4. In a caster socket, a load supporting plate portion, a slide portion carried by and bearing upon said plate portion for supporting a load, a caster stem socket tube passing through both of said portions, and spaced flanges on said tube engaging with said portions to hold the tube in position.

5. In a caster socket, a base having an opening therein, a load supporting plate secured to said base and spaced therefrom, a slide portion secured to said plate portion for supporting a load, said load supporting and slide portions having openings therein registering with the opening in said base, a socket tube passing through the openings in said portions and into the opening in said base, and means on said tube cooperating with said portions to hold the tube in position.

In witness whereof, I have hereunto affixed my signature.

WILLIAM H. NOELTING.